US008228571B2

(12) United States Patent
Beegle et al.

(10) Patent No.: US 8,228,571 B2
(45) Date of Patent: Jul. 24, 2012

(54) IMAGE SCANNING APPARATUS AND METHODS

(75) Inventors: James Thomas Beegle, Georgetown, KY (US); Chengwu Cui, Lexington, KY (US); Adam Christopher Kelty, Georgetown, KY (US); Charles Brandon Langrel, Lexington, KY (US); Joshua Tyler Strow, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 145 days.

(21) Appl. No.: 12/329,806

(22) Filed: Dec. 8, 2008

(65) Prior Publication Data

US 2010/0142008 A1    Jun. 10, 2010

(51) Int. Cl.
 H04N 1/04 (2006.01)
 G03G 21/20 (2006.01)
(52) U.S. Cl. ........... 358/497; 358/474; 358/471; 399/92
(58) Field of Classification Search .................. 358/471, 358/497, 474, 401, 400, 500, 505; 361/679.51, 361/679.48; 399/44, 69
See application file for complete search history.

(56) References Cited

U.S. PATENT DOCUMENTS

| 4,517,883 | A | * | 5/1985 | Levchenko et al. ............. 454/61 |
| 4,530,589 | A | * | 7/1985 | Adams ............................ 399/92 |
| 4,695,151 | A | * | 9/1987 | Watanabe ........................ 399/92 |
| 5,202,735 | A | * | 4/1993 | Thayer ........................... 399/102 |
| 5,729,793 | A | * | 3/1998 | Inoue ............................... 399/92 |
| 5,749,025 | A | * | 5/1998 | Oda et al. ........................ 399/92 |
| 5,860,042 | A | * | 1/1999 | Tomaru et al. .................. 399/92 |
| 6,463,230 | B1 | * | 10/2002 | Wargo ............................. 399/92 |
| 6,938,473 | B2 | * | 9/2005 | Iwaki et al. ................ 73/204.21 |
| 7,305,201 | B2 | * | 12/2007 | Kimura ........................... 399/92 |
| 7,474,528 | B1 | * | 1/2009 | Olesiewicz et al. ........... 361/695 |
| 2008/0117589 | A1 | * | 5/2008 | Carrera et al. ................ 361/687 |
| 2009/0028611 | A1 | * | 1/2009 | Matsumoto et al. .......... 399/258 |

FOREIGN PATENT DOCUMENTS

| JP | 2005041225 A | * | 2/2005 |
| JP | 2006126604 A | * | 5/2006 |
| JP | 2009111232 A | * | 5/2009 |

* cited by examiner

Primary Examiner — Cheukfan Lee

(57) ABSTRACT

Method and image scanning apparatus comprising an image capture unit having an illumination assembly for generating input light; a printed circuit board mounted to the image capture unit, a cooling unit generating an airflow which cools the illumination assembly of the image capture unit as well as the critical components mounted on the printed circuit board and the optical components of the image capture unit; and an adjustable baffle member moveably mounted to the frame of the image scanning apparatus for controlling the path of the airflow relative to the lamp. The cooling unit comprises at least one fan with the fan generating airflow for cooling the lamp of image capture unit. The baffle member is adjustable to control the airflow generated by the fan such that the airflow generated by the fan is redirected downward and passes the airflow under the image capture unit, thereby effectively and evenly cooling the lamp and redirecting contaminants to the end of the image scanning apparatus enclosure opposite the image capture unit.

8 Claims, 2 Drawing Sheets

IMAGE SCANNING APPARATUS AND METHODS

CROSS REFERENCES TO RELATED APPLICATIONS

None.

BACKGROUND

1. Field of the Invention

The present invention relates generally to an apparatus and method for scanning and, more particularly, to adjusting the airflow of a cooling unit in an image scanning apparatus.

2. Description of the Related Art

Photographs, transparencies, documents and other images are often electronically scanned to produce a digital representation of the image. Typically, the image is scanned with light in order to generate a digital representation of the image.

A simple flatbed scanner consists of an enclosure and an image capture device that is often referred to as the scanhead. One example of an image capture device is a charge-coupled device module (CCDM). The CCDM contains, among other items, an illumination assembly with one or more than one lamps to provide a light source for capturing the image. Hereafter, for simplicity, we use the lamp to refer to the illumination assembly which may include its driving circuitry such as in the form of an electronic inverter. The lamp dissipates heat as expected and the heat generated varies across lamp designs. It is commonly desired for the lamp to provide "instant on" capability to reduce the time for first scan or copy. An example of this type of lamp is external electrode xenon fluorescent lamps. In a scanner using xenon fluorescent lamp at the higher illuminance required to meet an image scanning apparatus with a high image forming speed, the xenon fluorescent lamp is often heated to a high temperature due to its relatively lower energy to light conversion efficiency. Another component of the CCDM is the sensor itself which is typically mounted to a printed circuit board (PCB) that is mounted to the CCDM. It is important that the heat from the lamp does not affect the image capture unit, its optical system, or electrical components of the printed circuit board.

In the prior art a typical solution as shown in FIG. 1 is to introduce a cooling unit such as a fan to direct airflow across the lamp thereby effectively cooling the lamp and carrying the heat away from the critical components of the image capture unit and printed circuit board. However, in order for the lamp to operate correctly the temperature distribution from one end to the other end should not vary by more than a predefined temperature limit. In the preferred embodiment of the present invention, this temperature difference is 30 degrees C. The typical design that incorporates a fan does not provide even cooling of the lamp and while it is possible for additional fans to be used, the use of additional fans results in higher production cost and creates other airflow issues. Additionally, a fan introduces contamination into the scanner by blowing air from the outside into the scanner chamber that houses the image capture unit. While a filter can be placed on the fan, inevitably some contaminants pass through and are introduced into the scanner along with ambient air. The optics of the image capture unit are very sensitive to contaminants which gather around the location of the optical path near the document plane or near the sensor array producing objectionable vertical lines on the scanned document. Further, when contaminants gather in other locations of the optical path of the image capture unit optics, an undesirable scattering that decreases the contrast and resolution of the scan.

Thus, there is still a need for a single fan to effectively and evenly cool the lamp as well as the critical components of the printed circuit board and the optical components of the image capture unit. Further, the fan needs to direct contamination away from the image capture unit in order to avoid image defects that affect the image quality of the image scanning apparatus.

SUMMARY OF THE INVENTION

The present invention meets these needs by providing an innovation that manipulates the airflow such that a single fan can effectively cool the entire lamp as well as the critical components of the printed circuit board and the optical components of the image capture unit evenly and directs the contamination away from sensitive optical components of the image capture unit. The airflow is manipulated such that the contaminants are carried away from the image capture unit and pushed out of the scanner via the openings inside the scanner or they settle at the opposite end of the image capture unit in the scanner housing.

Accordingly, in an aspect of the present invention, an image scanning apparatus comprises an image capture unit with a lamp for generating input light; a printed circuit board mounted to the image capture unit; a cooling unit generating an airflow which cools the lamp of the image capture unit as well as the critical components of the printed circuit board and the optical components of the image capture unit; and an adjustable baffle member moveably mounted to the frame of the image scanning apparatus which controls the path of the airflow relative to the lamp. One example of an image capture unit is a charge-coupled device module (CCDM). It is preferred that the lamp provide "instant on" capability to reduce the time for the first scan or copy, thus a preferred embodiment of the present invention uses a external electrode xenon fluorescent lamp. The cooling unit comprises at least one fan with the fan generating airflow for cooling the lamp of image capture unit. The baffle member is adjustable to control the airflow generated by the fan such that the airflow generated by the fan is redirected downward and passes the airflow under the image capture unit. The baffle member is mounting to the enclosure of the image scanning device using a mounting member such as a bracket and is mounted on or near the fan and may be placed in front of or behind the fan. The baffle member may be adjusted to increase airflow by using an adjustment knob which is rotated to loosen and tighten relative to the mounting device so as to clamp the baffle member in any selected rotated position relative to the mounting device and the cooling unit.

In another aspect of the present invention, there is provided a method for adjusting airflow of a cooling unit in an image scanning apparatus, comprising movably mounting a baffle member to the frame of the image scanning apparatus and adjusting the baffle member to control the airflow generated by a cooling unit that cools the lamp of the image capture unit such that the airflow generated by the cooling unit is redirected downward and passes the airflow under said image capture unit. The redirected airflow generated by the cooling unit evenly cools the image capture unit. The baffle member is adjusted such that the redirected airflow moves in a counterclockwise motion, thereby carrying any contaminants away from the image capture unit to the opposite end of the scanner flatbed housing.

BRIEF DESCRIPTION OF THE DRAWINGS

Figure 1:
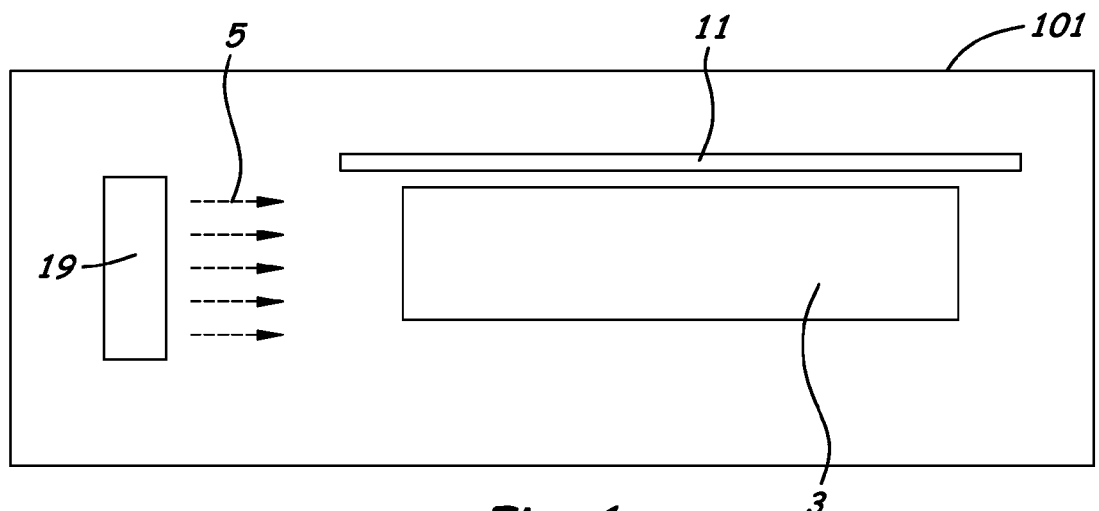

Having thus described the invention in general terms, reference will now be made to the accompanying drawings, which are not necessarily drawn to scale, and wherein:

FIG. 1 is a side view of the airflow for a prior art image scanning apparatus.

Figure 2:
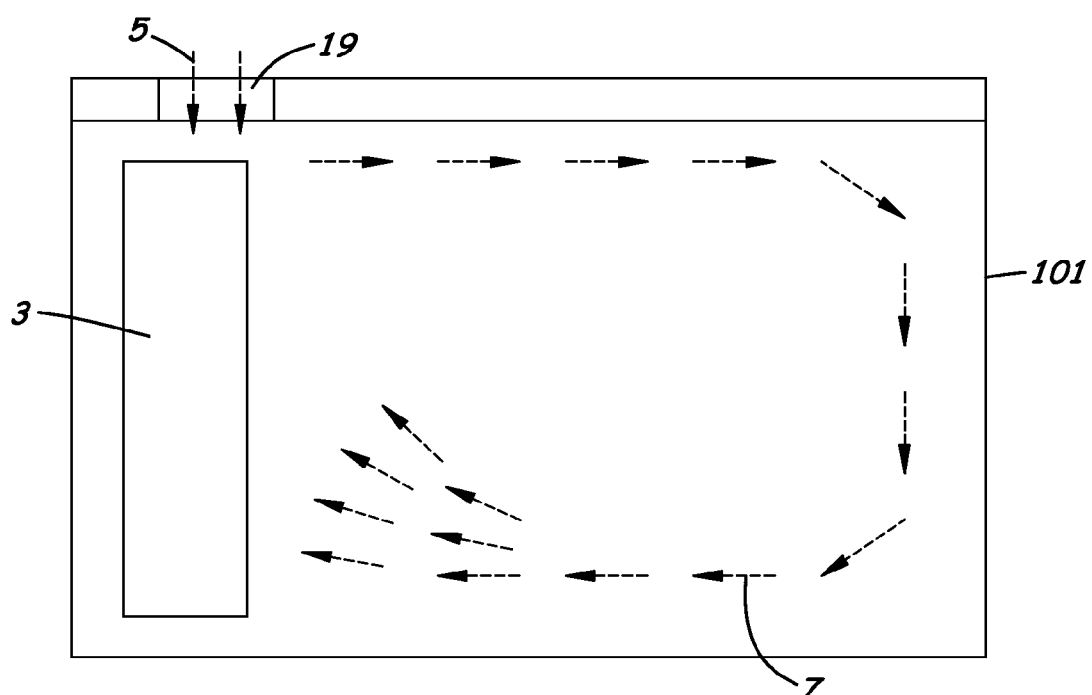

FIG. 2 is a top view of the airflow for a prior art image scanning apparatus.

Figure 3:
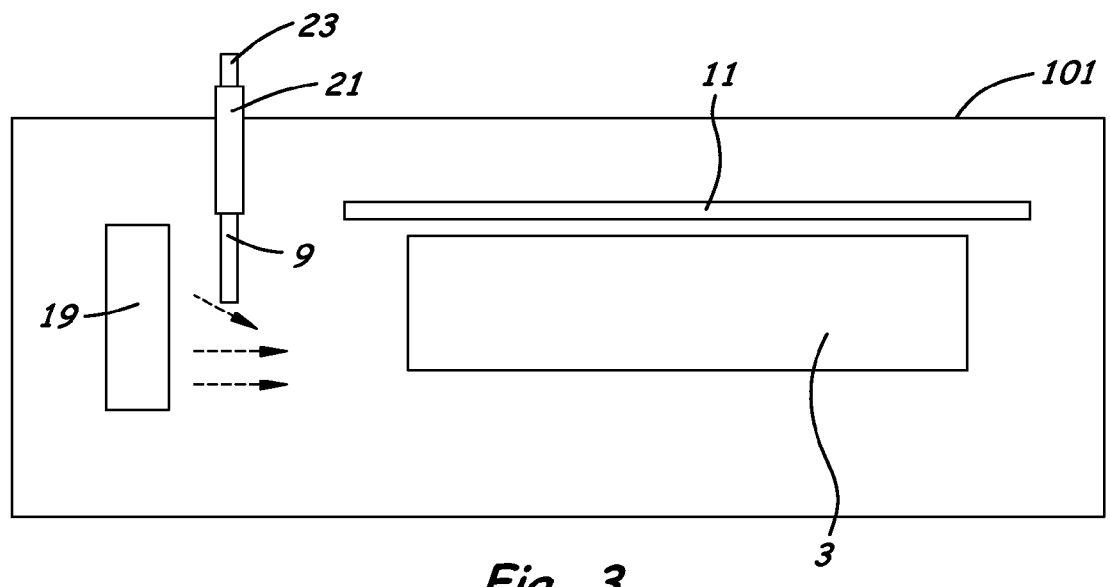

FIG. 3 is a side view of the airflow for the present invention.

Figure 4:
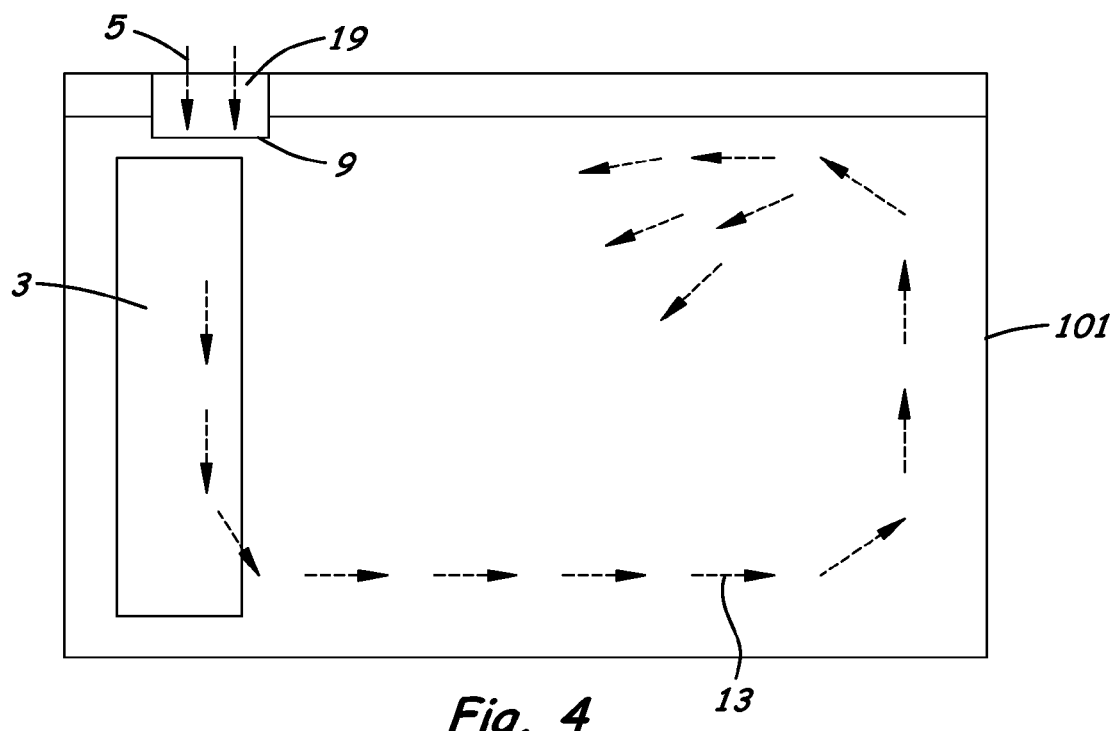

FIG. 4 is a top view of the airflow for the present invention.

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

Referring to FIG. 1, there is illustrated the side view of the airflow for a prior art image scanning apparatus using a cooling fan. The image capture unit 3 is located below the platen glass 11. The printed circuit board (not shown) within the image scanning apparatus enclosure 101 is mounted to the image capture unit 3. Located at a position capable of supplying airflow 5 to the image capture unit 3 is a cooling unit 19. As the airflow 5 hits the side of the image capture unit 3, the airflow 5 becomes more turbulent with relatively slower speed as the airflow 5 moves around and through the image capture unit 3.

Turning to FIG. 2, there is illustrated a top view of a prior art scanner airflow without any baffle member. The airflow 5 of the cooling unit 19 is passed over and through the image capture unit 3 which deflects the airflow 5 off the image capture unit 3 and creates a clockwise airflow 7 which carries or picks up contaminants around the image scanning apparatus enclosure 101 until they settle around the image capture device 3.

Referring now to FIG. 3, there is illustrated the side view of the airflow for the present invention with an image capture unit 3 located below the platen glass 11. The printed circuit board (not shown) is mounted to the image capture unit 3. Located at a position capable of supplying airflow 5 to the image capture unit 3 is a cooling unit 19. The cooling unit may be comprised of at least one cooling fan. The image capture unit is comprised of a lamp (not shown), an optical sensor (not shown) and an image signal generation unit (not shown). The baffle member 9 redirects the airflow 5 downward. The airflow 5 removes heat from the image capture unit 3 and effectively cools the lamp (not shown) evenly. The baffle member 9 may be made of plastic, sheet metal, a part of the frame of the scanner or other materials that may alter or redirect airflow. The baffle member 9 is moveably mounted to the image scanning apparatus enclosure 101 frame of the scanner using a mounting device 21 such as a bracket and is placed either in front of or behind the fan. The baffle member 9 may be adjusted to increase airflow by using an adjustment knob 23 which is rotated to loosen and tighten relative to the mounting device 21 so as to clamp the baffle member 9 in any selected rotated position relative to the mounting device 21 and the cooling unit 19.

Turning to FIG. 4, there is illustrated a top view of the scanner airflow with the baffle member 9. The baffle member 9 redirects the airflow 5 of the cooling unit 19 under the image capture unit 3 and creates a counterclockwise airflow 13 in order to allow contaminants to settle on the opposite end of the image scanning apparatus enclosure 101 instead of around the image capture device 3.

The foregoing description of several embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

What is claimed is:

1. An image scanning apparatus, comprising:
   an image capture unit having an illumination assembly with one or more than one lamp for generating input light;
   a cooling unit for generating an airflow which cools the illumination assembly of the image capture unit, critical components on printed circuit boards and optical components of the image capture unit; and
   a baffle member mounted to a frame of the image scanning apparatus for redirecting a path of the airflow substantially downward and under the image capture unit such that the image capture unit is not in the path of the airflow so as to substantially evenly cool the one or more than one lamp;
   wherein said cooling unit comprises at least one fan, the fan generating airflow for cooling the one or more than one lamp of the image capture unit;
   wherein said baffle member is moveably mounted to the frame of the image scanning apparatus and is adjustable to control the airflow generated by said at least one fan; and
   wherein said redirected airflow moves in a motion that allows contaminants in the airflow to settle on an end of the image scanning apparatus opposite the image capture unit.

2. The apparatus of claim 1 wherein said baffle member is made from a material selected from the group consisting of plastic, sheet metal, or other suitable material.

3. The apparatus of claim 1 wherein said baffle member is moveably mounted to the image scanning apparatus at a location in front of said at least one fan.

4. The apparatus of claim 1 wherein said baffle member is moveably mounted to the image scanning apparatus at a location behind said at least one fan.

5. The apparatus of claim 1 wherein said lamp is an external electrode xenon fluorescent lamp.

6. A method for adjusting airflow of a cooling unit in an image scanning apparatus, comprising;
   movably mounting a baffle member to a frame of the image scanning apparatus; and
   adjusting the baffle member to control a path of an airflow generated by a cooling unit that cools one or more than one lamp of an image capture unit such that the airflow generated by the cooling unit is redirected substantially downward and under said image capture unit so that the image capture unit is not in the path of the airflow;
   wherein said baffle member is adjusted such that said redirected airflow moves in a motion that allows contaminants in the airflow to settle on an end of the image scanning apparatus opposite the image capture unit.

7. The method of claim 6 wherein said redirected airflow generated by said cooling unit evenly cools said lamp of the image capture unit.

8. An image scanning apparatus, comprising:
   an image capture unit having at least one light source;
   a cooling unit for generating an airflow that is used to cool the image capture unit, the cooling unit comprising a fan; and
   a baffle member for redirecting a path of the airflow substantially downward and under the image capture unit such that the image capture unit is not in the path of the airflow so as to substantially evenly cool the at least one light source, wherein said redirected airflow moves in a motion that allows contaminants in the airflow to settle on an end of the image scanning apparatus away from the image capture unit; wherein the baffle member is moveably mounted to a frame of the image scanning apparatus and is adjustable to control the airflow generated by said cooling unit.

* * * * *